(12) United States Patent
Sharma et al.

(10) Patent No.: US 12,405,739 B1
(45) Date of Patent: Sep. 2, 2025

(54) MULTI-PROTOCOL DATA STORAGE DEVICE AND METHOD FOR SUSTAINED WRITE PERFORMANCE

(71) Applicant: Western Digital Technologies, Inc., San Jose, CA (US)

(72) Inventors: Amit Sharma, Bangalore (IN); Abhinandan Venugopal, Mysore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 20 days.

(21) Appl. No.: 18/591,661

(22) Filed: Feb. 29, 2024

(51) Int. Cl.
*G06F 3/06* (2006.01)
*G06F 12/02* (2006.01)

(52) U.S. Cl.
CPC ............ *G06F 3/064* (2013.01); *G06F 3/0607* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 2013/0290600 | A1* | 10/2013 | Tzafrir | H01L 23/34 711/E12.008 |
| 2017/0017588 | A1* | 1/2017 | Frid | G06F 3/061 |
| 2017/0139591 | A1* | 5/2017 | Tomlin | G06F 12/0646 |
| 2017/0139823 | A1* | 5/2017 | Tomlin | G06F 12/1009 |
| 2017/0139837 | A1* | 5/2017 | Tomlin | G06F 3/0644 |
| 2017/0139838 | A1* | 5/2017 | Tomlin | G06F 12/1009 |
| 2023/0400899 | A1* | 12/2023 | Gunda | G06F 3/0616 |

* cited by examiner

*Primary Examiner* — Kevin Verbrugge
(74) *Attorney, Agent, or Firm* — Crowell & Moring LLP

(57) ABSTRACT

A multi-protocol data storage device can be configured to be backwards compatible with multiple protocol versions. Each protocol version can have a different power requirement, which can result in the inability to power all of the memory dies. In some situations, it is desired to perform program operations on different meta blocks of memory. To help ensure that the program operations are performed on the same memory die when not all of the memory dies are powered, one of the program operations can be performed in a first meta block, and the other program operation can be performed in a selected smaller meta block that shares a powered memory die in common with the first meta block.

20 Claims, 9 Drawing Sheets

US 12,405,739 B1

MULTI-PROTOCOL DATA STORAGE DEVICE AND METHOD FOR SUSTAINED WRITE PERFORMANCE

BACKGROUND

A multi-protocol data storage device is a data storage device that is configured to be backwards compatible with multiple protocol versions. The speed and power consumption of a multi-protocol data storage device can depend on the protocol of the host that is connected with the multi-protocol data storage device.

DETAILED DESCRIPTION

The following embodiments generally relate to a multi-protocol data storage device and method for sustained write performance. In one embodiment, a data storage device is provided comprising a memory and one or more processors. The memory comprises a plurality of memory dies, wherein a first meta block comprises blocks from each of the plurality of memory dies, and wherein each additional meta block of a plurality of additional meta blocks comprises blocks from different subsets of the plurality of memory dies. The one or more processors, individually or in combination, are configured to: determine which of the plurality of memory dies are being programmed in the first meta block; and select an additional meta block from the plurality of additional meta blocks for a program operation, wherein the selected additional meta block comprises a block from a memory die that is being programmed in the first meta block.

In another embodiment, a method is performed in a data storage device comprising a memory comprising a plurality of memory dies. The method comprises: creating a first meta block comprises multi-level cell (MLC) blocks from each of the plurality of memory dies; creating a plurality of additional meta blocks, wherein each additional meta block comprises single-level cell (SLC) blocks from different subsets of the plurality of memory dies; determining whether all of the plurality of memory dies are powered; and in response to determining that not all of the plurality of memory dies are powered, choosing an additional meta block from the plurality of additional meta blocks for a program operation, wherein the chosen additional meta block comprises a block from a memory die that is being programmed in the first meta block.

In yet another embodiment, a data storage device is provided comprising: a memory comprising a plurality of memory dies, wherein a first meta block comprises blocks from each of the plurality of memory dies, and wherein each additional meta block of a plurality of additional meta blocks comprises blocks from different subsets of the plurality of memory dies; and means for selecting an additional meta block from the plurality of additional meta blocks for a program operation, wherein the selected additional meta block comprises a block from a memory die that is powered and is currently or expected to be programmed in the first meta block.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
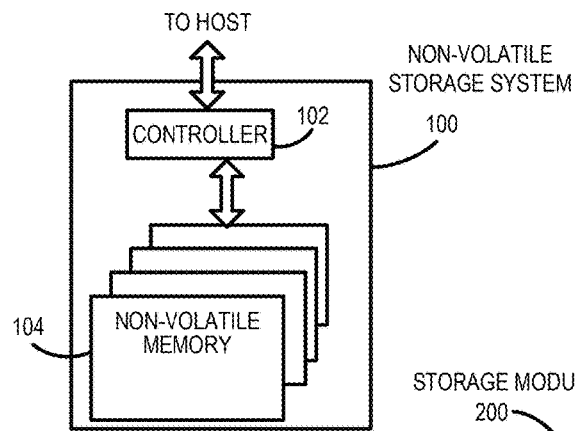
FIG. 1A is a block diagram of a data storage device of an embodiment.
Figure 1B:
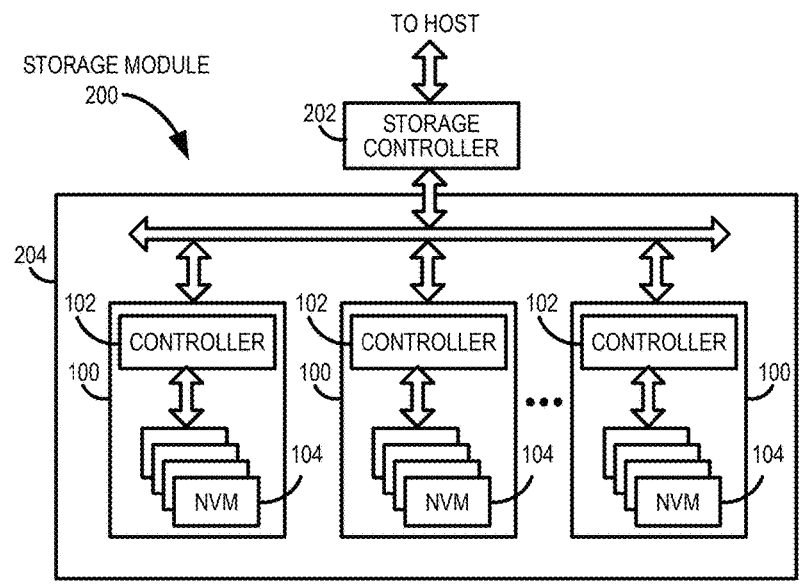
FIG. 1B is a block diagram illustrating a storage module of an embodiment.
Figure 1C:
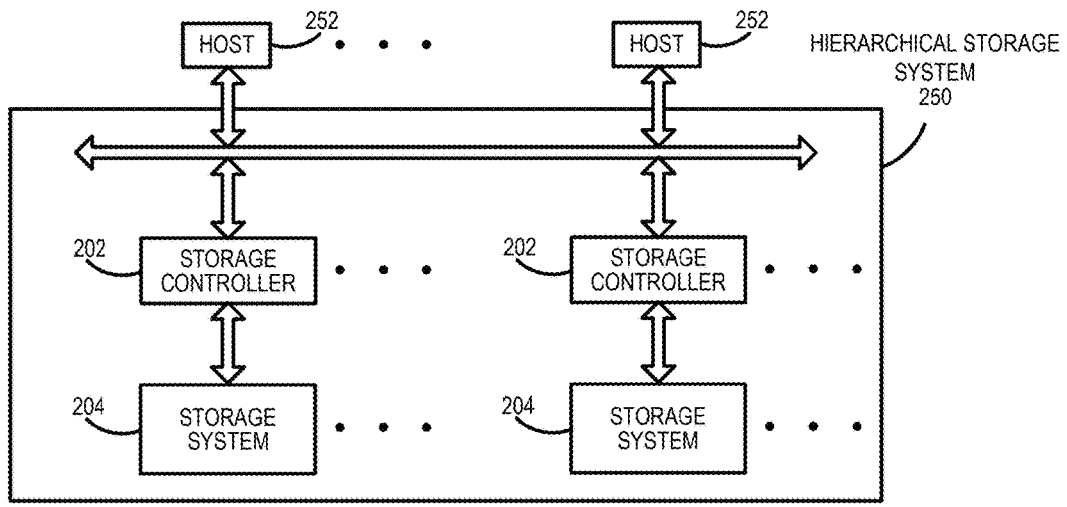
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
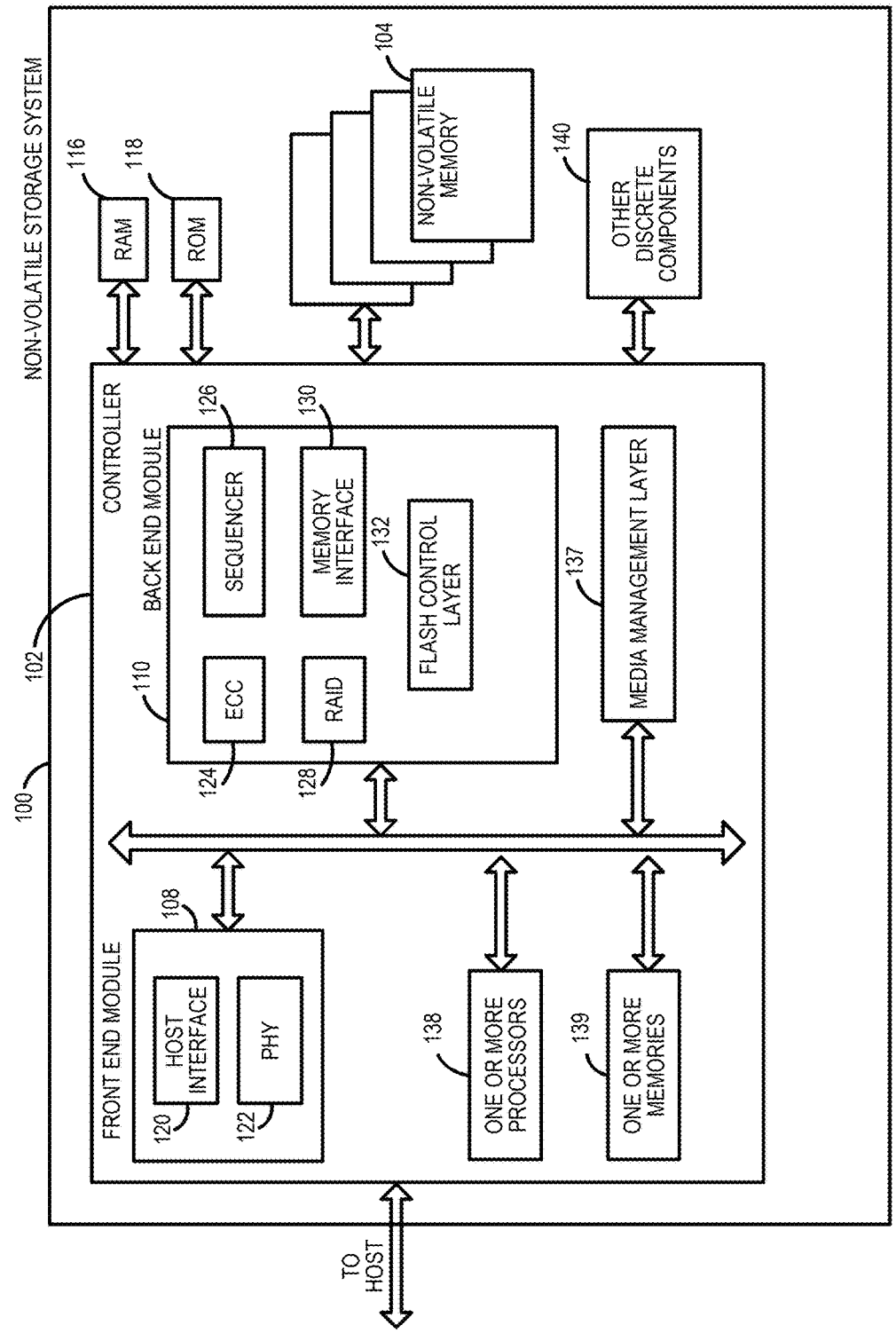
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
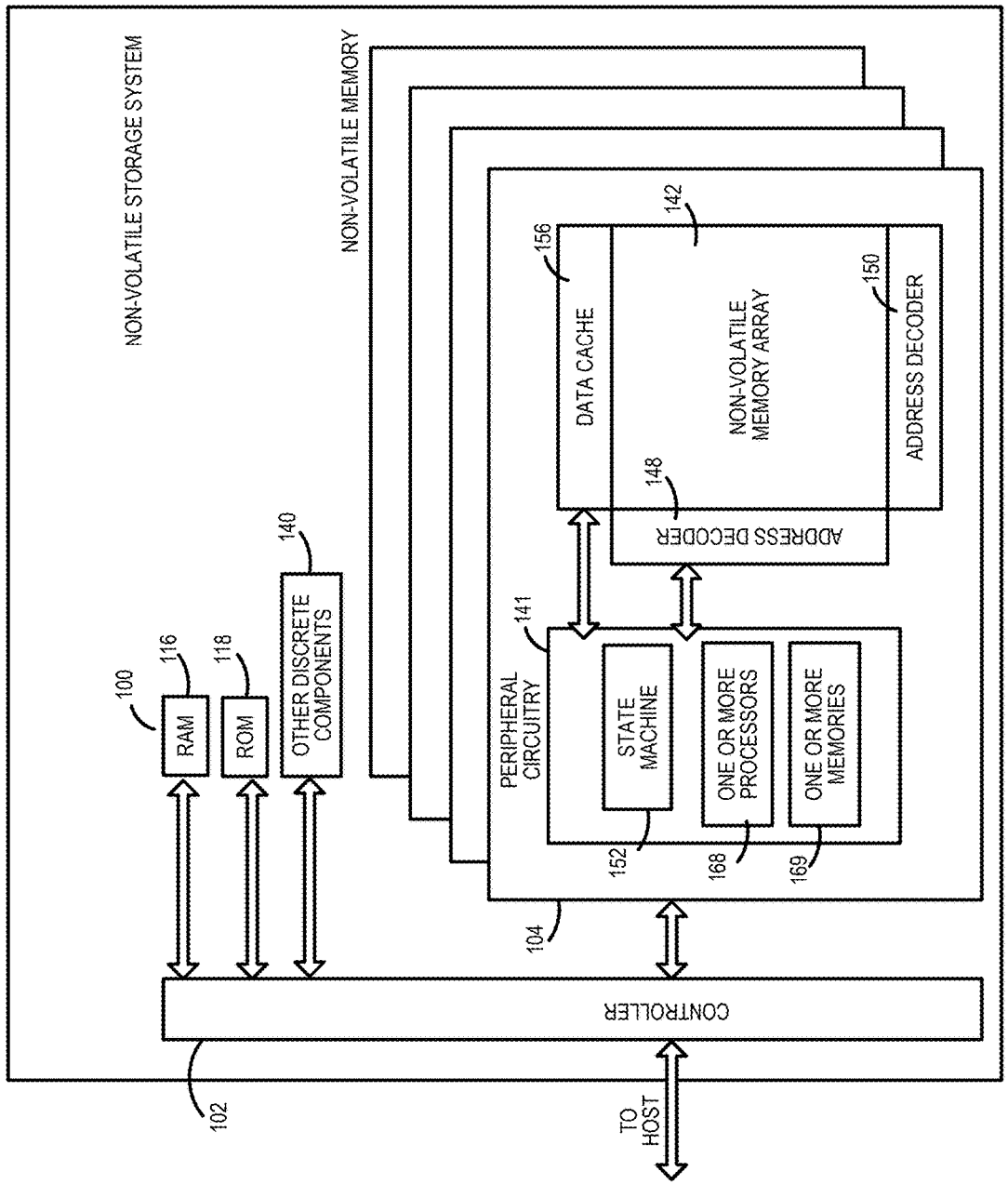
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
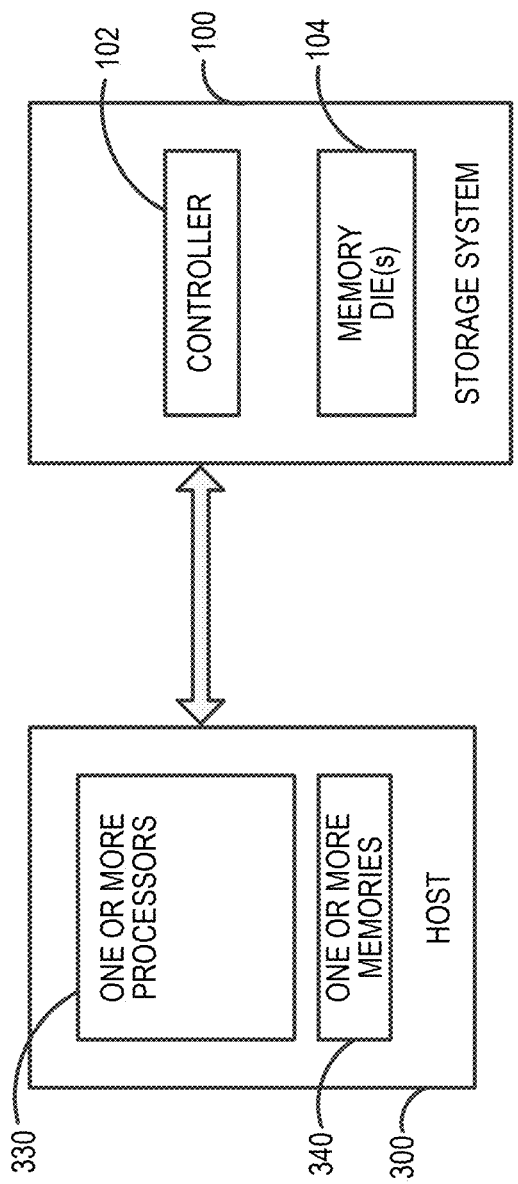
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

If the data storage device is a removable or external device, the data storage device 100 may need to be backwards compatible with multiple protocol versions of multiple different hosts that the data storage device can be connected with. Such a data storage device is sometimes referred to herein as a "multi-protocol data storage device." For example, a USB 4 drive can be backwards compatible with USB 3.2, USB 3, etc. hosts. Other types of data storage devices can also operate in multiple protocol types, such as, but not limited to, a dual USB drive (e.g., micro USB, USB, etc.)

A multi-protocol data storage device can act as a different data storage device with respect to speed and power consumption depending on the host that it is connected with. For example, when a USB 4 data storage device is connected with an USB 4 host, the USB 4 data storage device can have a speed up to four giga-bytes per second (GBps) and an allowed power of about 15 Watts (W). However, when the USB 4 data storage device is connected with a USB 3.2 host and used in a backwards-compatible mode, the speed and allowed power are reduced to two GBps and about 7.5 W, respectively. Further, when the USB 4 data storage device is connected with an USB 3.1 host and used in a backwards-compatible mode, the speed and allowed power are further reduced to one GBps and about 4.5 W, respectively. As can be seen by these examples, each protocol version permits the data storage device to consume a specific amount of power.

Figure 4:
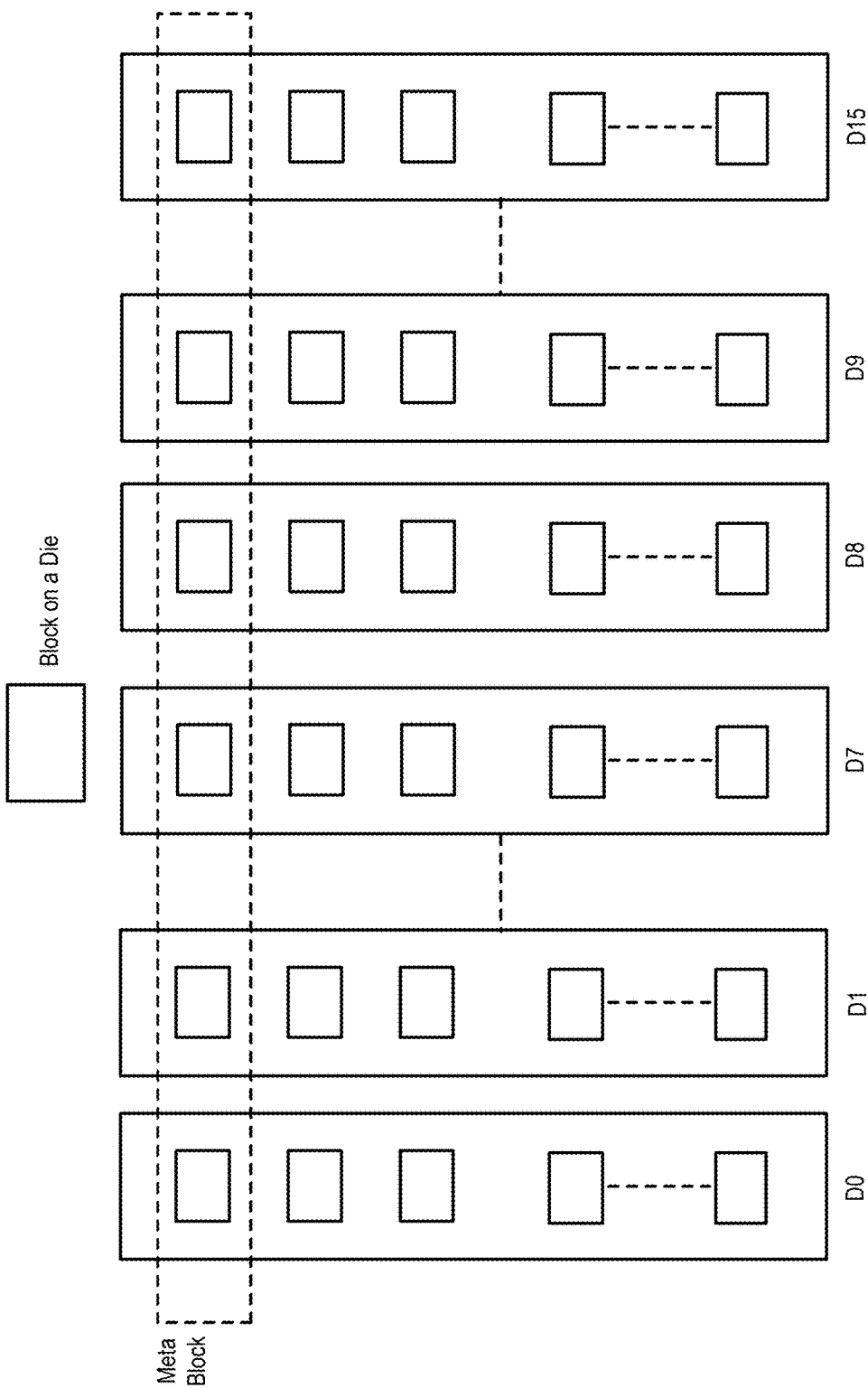
FIG. 4 is an illustration of multiple dies of a data storage device of an embodiment showing meta block formation to achieve maximum die parallelism.

Each protocol version can also have an effect on die parallelism when the data storage device's memory comprises a plurality of memory dies. Die parallelism can be achieved by creating a "meta block" that incorporates blocks from multiple memory dies (e.g., all of the memory dies). In one embodiment, the flash translation layer (FTL) (e.g., the flash control layer 132 in the controller 102), which can perform block selection and logical-to-physical address mapping, operates at the meta block level. If a meta block comprises blocks from all the memory dies, the meta block activates all the memory dies in parallel during a meta block operations. FIG. 4 is an illustration of multiple dies of a data storage device of an embodiment showing meta block formation to achieve maximum die parallelism. As shown in FIG. 4, in a data storage device having 16 memory dies (D0 to D15), a meta block can be formed from one block in each memory die. While the FTL can operate at a meta page level, all the memory dies are involved in parallel.

Because a multi-protocol data storage device needs to support multiple protocol versions with variable speed and allowed power, the data storage device can be configured to support the fastest configuration (e.g., by forming a meta block having the maximum allowed power and then control power for lower configuration). Memory dies are one of the key consumers of power in the data storage device, and a power budget of the data storage device can limit parallel die operation. For example, in USB 3.2, the maximum power allowed is 7.5 W, which allows 16 memory dies to operate in parallel. In contrast, in USB 3.1, the maximum power allowed is 4.5 W, which allows only eight memory dies to operate in parallel. So, the FTL of the data storage device can create a meta block from 16 dies in USB 3.2 but from only eight dies in USB 3.1.

This limitation on die parallelism can create an issue with respect to a multi-level cell (MLC) suspend/resume feature of the memory. An MLC (e.g., a triple-level cell (TLC)) suspend/resume feature allows the transfer time behind a TLC program to be hidden, which helps hide the transfer time of a group allocation table (GAT), iGAT, XOR parity, and other control page writes. There can be additional benefits in data storage devices that implement a snapshot XOR scheme for extra protection of open blocks. In such data storage devices, all memory dies of a meta page are XOR'ed together and stored in a block called a snapshot block. For each meta page worth of data, one memory die's page worth of parity is stored in a single-level cell (SLC) block. Depending on available volatile memory (e.g., RAM), XOR parity can be stored after one or more meta pages. During an XOR parity store, to ensure sanity of XRAM content, barriers can be issued. If suspend/resume is allowed, both parity program and barrier blockage can be hidden behind a TLC program. For example, a suspend/resume with one XOR buffer can have a gain of ~100 MBps, whereas allocating four buffers can provide a gain of about 65 MBps for an eight-die configuration.

Figure 5:
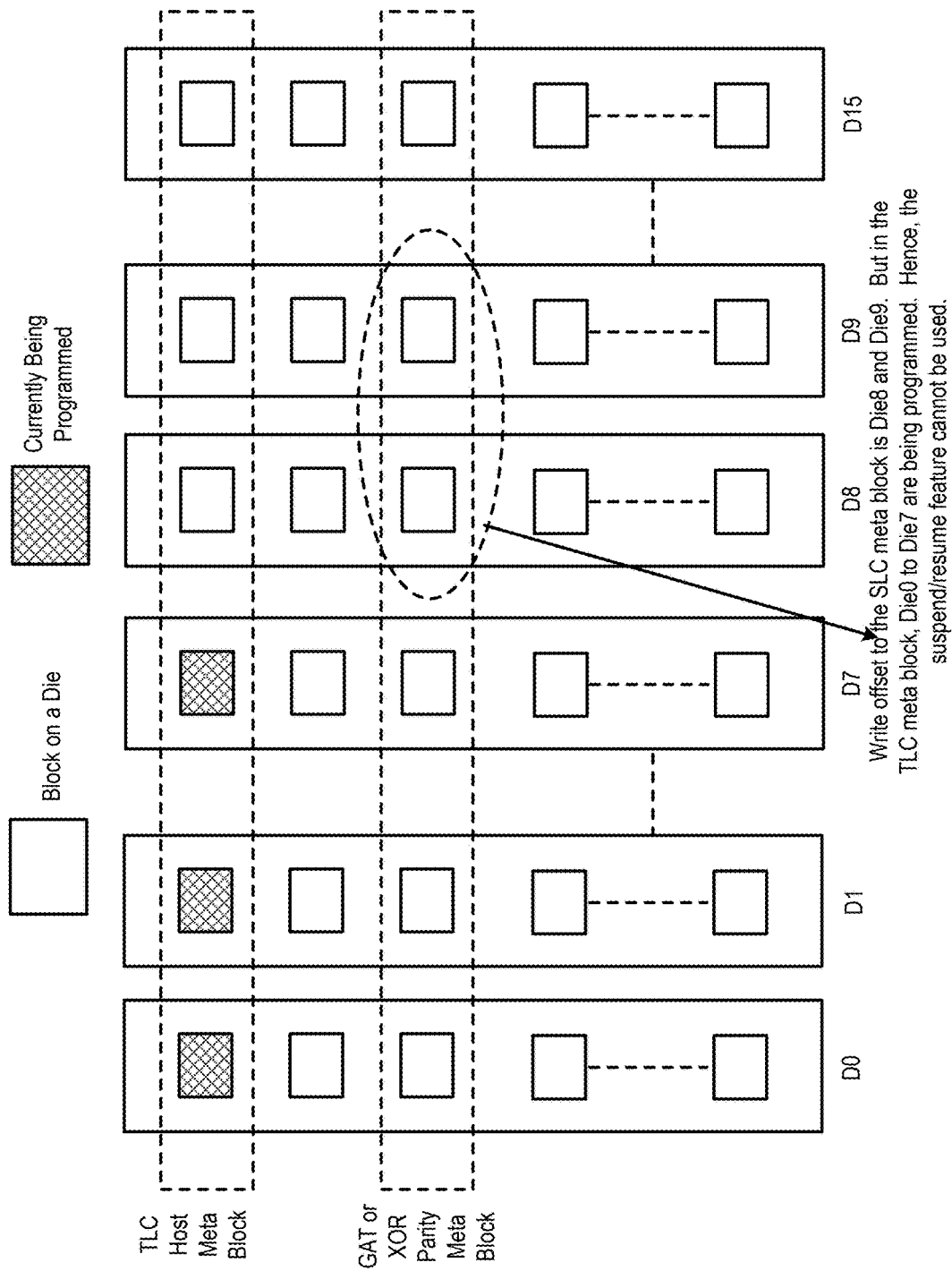
FIG. 5 is an illustration of multiple dies of a data storage device of an embodiment showing that a 16-memory-die meta block with maximum power is allowed to operate eight memory dies in parallel.

In USB 3.2, a meta block can be formed from 16 memory dies, but, when the data storage device is used with a USB 3.1 host, there is power for only eight memory dies. Depending on the next write location of a TLC host block and SLC block (GAT or iGAT or XOR), memory dies where data needs to be programmed can be different. If the memory dies that are being programmed in TLC and SLC are different, the suspend/resume feature may not be able to be utilized, which can cause a performance drop. This is illustrated in FIG. 5. FIG. 5 shows a TLC host meta block and a GAT or XOR parity meta block. The write offset to the SLC meta block is Die8 and Die9 but, in the TLC meta block, Die0 to Die7 are being programmed. Hence, the suspend/resume feature cannot be used.

As shown by this example, a meta block with 16 dies would work well for USB 3.2 (with program/suspend/resume (PSR) benefits) but when plugged into USB 3.1, PSR would not be possible when writing to TLC and SLC meta blocks that are not in the same dies, which can cause a performance drop. One way to address this issue is to create a smaller meta block for the full system. However, this can increase the snapshot parity generated and can require more data to be written, which would reduce performance and endurance of the memory.

The following embodiments provide another way to address this problem. In general, the controller 102 (e.g., using its FTL functionality) can maintain smaller meta blocks for SLC parity, GAT, iGAT, or other control blocks and select a SLC write meta block based on the current usage of TLC meta block dies. This can result in a high sustained performance for a multi-protocol data storage device without the need of any additional hardware resources. More specifically, these embodiments can help ensure that TLC and SLC writes occur on the same die. To achieve this, the controller 102 can form smaller meta blocks for the SLC block (e.g., the XOR snapshot block, GAT block, iGAT blocks, etc.). A smaller amount of data can be written at a time in these meta blocks, so high die parallelism is not required. So, in one embodiment, the data storage device 100 would have two (or more) types of SLC meta blocks for control data. These two meta blocks can have different sets of memory dies (e.g., Type 1 from D0-D7, and Type 2 from D8-D15). When there is a need to write data to these types of SLC meta blocks, the controller 102 can choose the meta block type to ensure that the same set of memory dies are being programmed with TLC operations.

Figure 6:
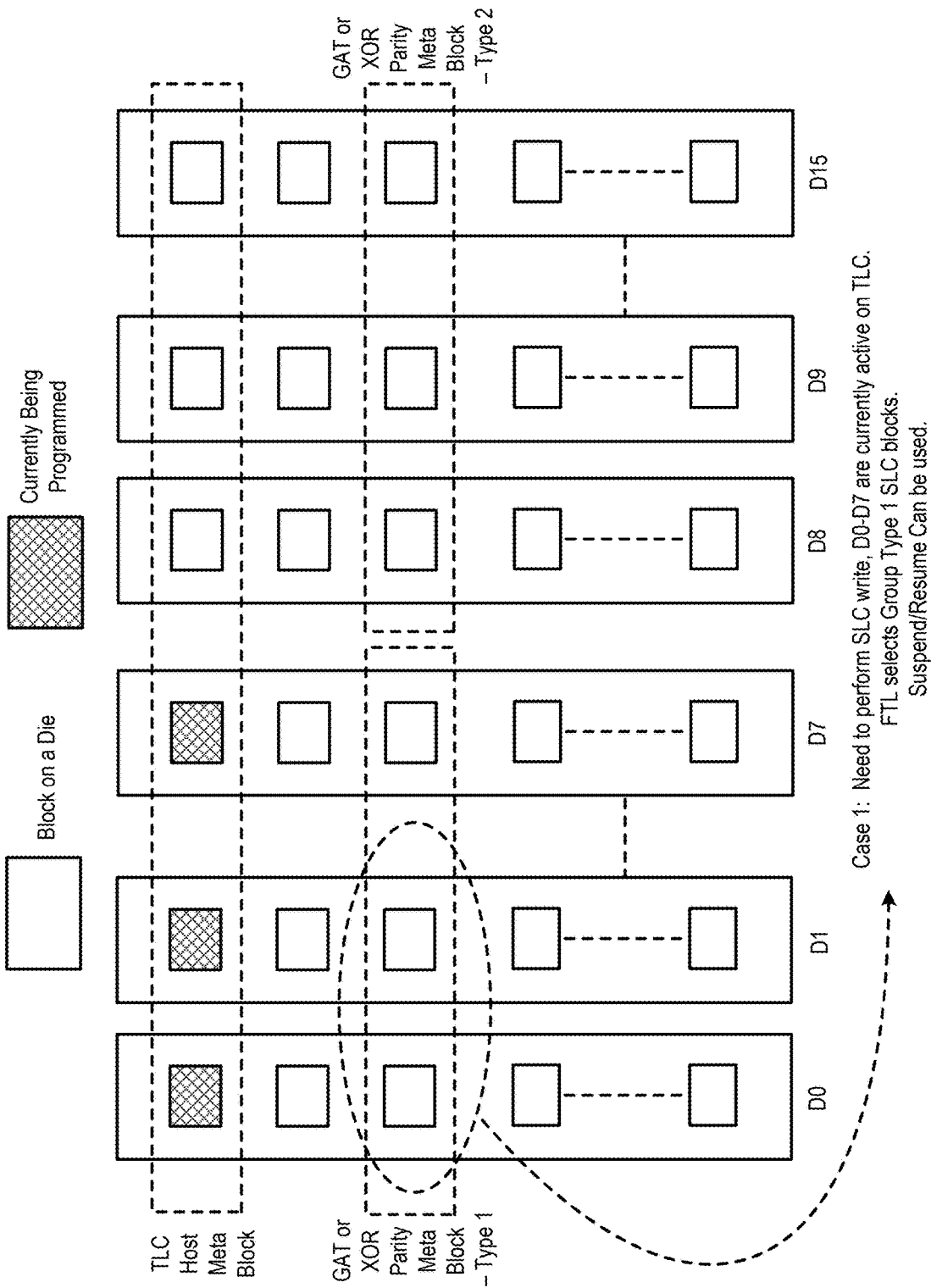
FIGS. 6 and 7 are illustrations of an embodiment in which different single-level cell (SLC) meta block types are selected based on a current/expected usage of a triple-level cell (TLC) meta block.
Figure 7:
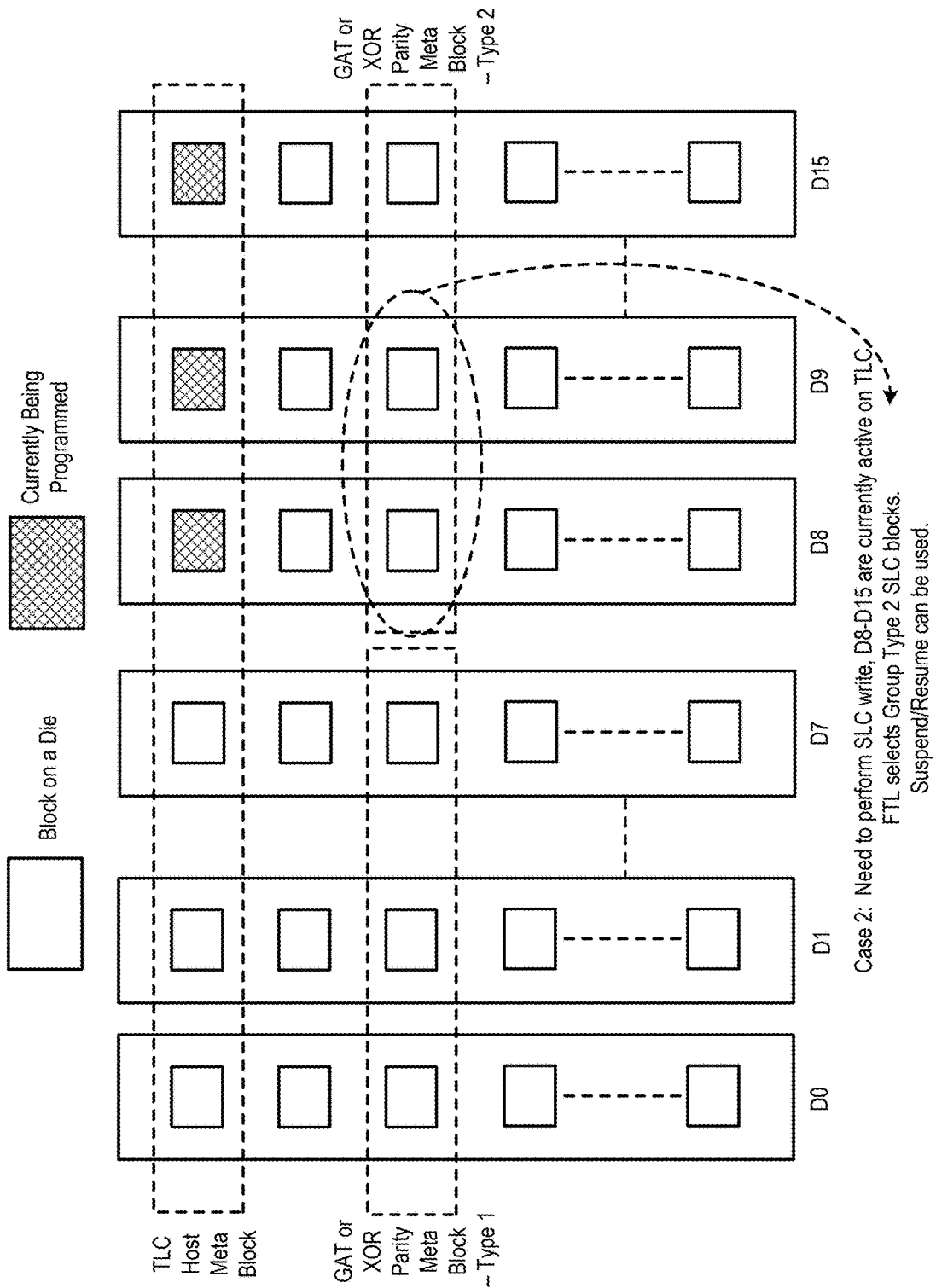

FIGS. 6 and 7 are illustrations of an embodiment in which different SLC meta block types are selected based on a current/expected usage of a TLC. In FIG. 6, there is a need to perform an SLC write, and D0-D7 are currently active on TLC. Here, the controller 102 selects Group Type 1 SLC blocks, and the suspend/resume feature can be used. In FIG. 7, there is a need to perform an SLC write, and D8-D15 are currently active on TLC. Here, the controller 102 selects Group Type 2 SLC blocks, and the suspend/resume feature can be used. As shown by these drawings, the controller 102 can maintain two smaller meta blocks for SLC control writes and can choose a block type for SLC based on which dies in the TLC meta block are busy. In Case 1, as dies in the first group are performing TLC operations, the controller 102 would direct data to Type 1 meta blocks of SLC. In Case 2, the controller 102 would direct data to Type 2 meta blocks of SLC. It should be noted that in this and other examples provided herein, instead of using TLC, another form of MLC (e.g., a quad-level cell (QLC) block) can be used.

The controller 102 can determine which TLC dies are expected to be busy is any suitable way. For example, the controller 102 can use current information from die scheduling engines, or the controller 102 can make an educated guess as TLC program takes a relatively-long time (e.g., about one millisecond).

Figure 8:
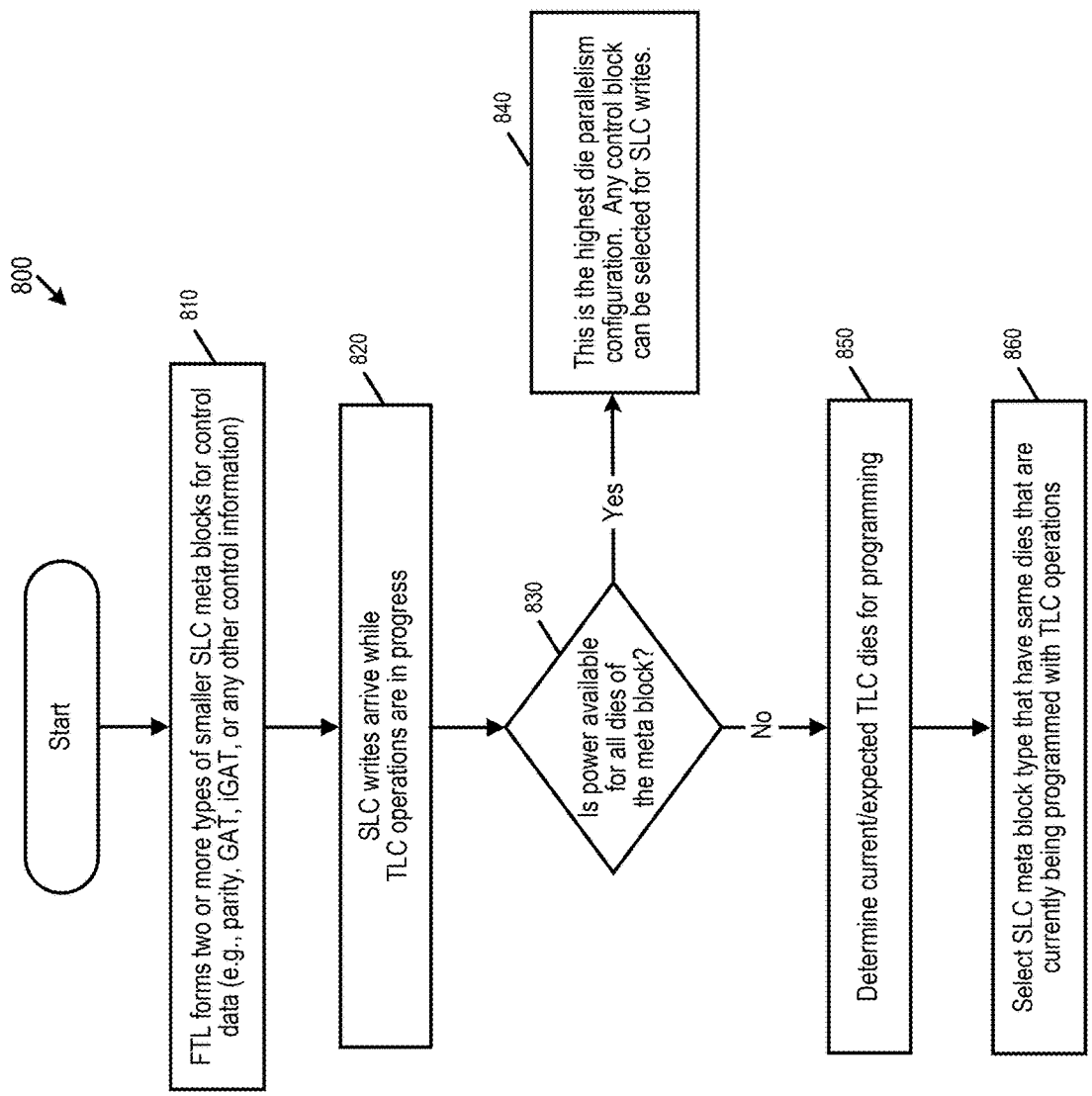
FIG. 8 is a flow chart of a method of an embodiment for ensuring higher sustained write performance in a multi-protocol data storage device.

FIG. 8 is a flow chart 800 of a method of an embodiment for ensuring higher sustained write performance in a multi-protocol data storage device. As shown in FIG. 8, the controller 102 (here, the FTL) forms two or more multiple types of smaller SLC meta blocks (e.g., smaller than the TLC meta block) for control data (e.g., parity, GAT, iGAT, or any other control information) (act 810). Next, SLC writes arrive while TLC operations are in progress (act 820). The controller 102 then determines if power to all the memory dies of the meta block are available (act 830). If power to all the memory dies of the meta block are available, this is the highest die parallelism configuration, and the controller 102 can select any control block for the SLC write (act 840). However, if power to all the memory dies of the meta block is not available, the controller 102 determines the current/expected TLC dies being programmed (act 850) then selects the SLC meta block type that have dies that are currently being programmed with TLC operations (act 860).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory comprising a plurality of memory dies, wherein a first meta block comprises blocks from each of the plurality of memory dies, and wherein each additional meta block of a plurality of additional meta blocks comprises blocks from different subsets of the plurality of memory dies; and
    one or more processors, individually or in combination, configured to:
        determine which of the plurality of memory dies are being programmed in the first meta block; and
        select an additional meta block from the plurality of additional meta blocks for a program operation, wherein the selected additional meta block comprises a block from a memory die that is being programmed in the first meta block.

2. The data storage device of claim 1, wherein the determining and selecting are performed in response to determining that not all of the plurality of memory dies are powered.

3. The data storage device of claim 2, wherein the data storage device comprises a multi-protocol data storage device, and wherein not all of the plurality of memory dies are powered due to the multi-protocol data storage device being operated in a backwards compatible mode.

4. The data storage device of claim 1, wherein the first meta block comprises multi-level cell (MLC) blocks and the additional meta blocks comprise single-level cell (SLC) blocks.

5. The data storage device of claim 1, wherein the one or more processors, individually or in combination, are further configured to:
    program host data in the first meta block; and
    program control data in the selected additional meta block.

6. The data storage device of claim 5, wherein the host data and the control data are programmed using a suspend/resume feature.

7. The data storage device of claim 1, wherein the one or more processors, individually or in combination, are further configured to determine which of the plurality of memory dies are being programmed in the first meta block based on scheduling information.

8. The data storage device of claim 1, wherein the one or more processors, individually or in combination, are further configured to determine which of the plurality of memory dies are being programmed in the first meta block based on a guess.

9. The data storage device of claim 1, wherein the one or more processors, individually or in combination, are further configured to create the first meta block and the plurality of additional meta blocks.

10. The data storage device of claim 1, wherein the memory comprises a three-dimensional memory.

11. In a data storage device comprising a memory comprising a plurality of memory dies, a method comprising:
    creating a first meta block comprises multi-level cell (MLC) blocks from each of the plurality of memory dies;
    creating a plurality of additional meta blocks, wherein each additional meta block comprises single-level cell (SLC) blocks from different subsets of the plurality of memory dies;
    determining whether all of the plurality of memory dies are powered; and
    in response to determining that not all of the plurality of memory dies are powered, choosing an additional meta block from the plurality of additional meta blocks for a program operation, wherein the chosen additional meta block comprises a block from a memory die that is being programmed in the first meta block.

12. The method of claim 11, further comprising:
    in response to determining that all of the plurality of memory dies are powered:
        choosing any of the plurality of additional meta blocks for the program operation.

13. The method of claim 11, wherein the data storage device comprises a multi-protocol data storage device, and wherein not all of the plurality of memory dies are powered due to the multi-protocol data storage device being operated in a backwards compatible mode.

14. The method of claim 11, further comprising:
    programing host data in the first meta block; and
    programing control data in the chosen additional meta block.

15. The method of claim 14, wherein the host data and the control data are programmed using a suspend/resume feature.

16. The method of claim 14, wherein the control data comprises a group allocation table.

17. The method of claim 14, wherein the control data comprises XOR data.

18. The method of claim 11, further comprising using scheduling information to determine which of the plurality of memory dies are being programmed in the first meta block.

19. The method of claim 11, further comprising using a guess to determine which of the plurality of memory dies are being programmed in the first meta block.

20. A data storage device comprising:
    a memory comprising a plurality of memory dies, wherein a first meta block comprises blocks from each of the plurality of memory dies, and wherein each additional meta block of a plurality of additional meta blocks comprises blocks from different subsets of the plurality of memory dies; and
    means for selecting an additional meta block from the plurality of additional meta blocks for a program operation, wherein the selected additional meta block comprises a block from a memory die that is powered and is currently or expected to be programmed in the first meta block.

\* \* \* \* \*